S. BUSCH.
MOUNTING FOR MOTOR CYCLE SADDLES.
APPLICATION FILED JULY 26, 1910.
975,827.
Patented Nov. 15, 1910.
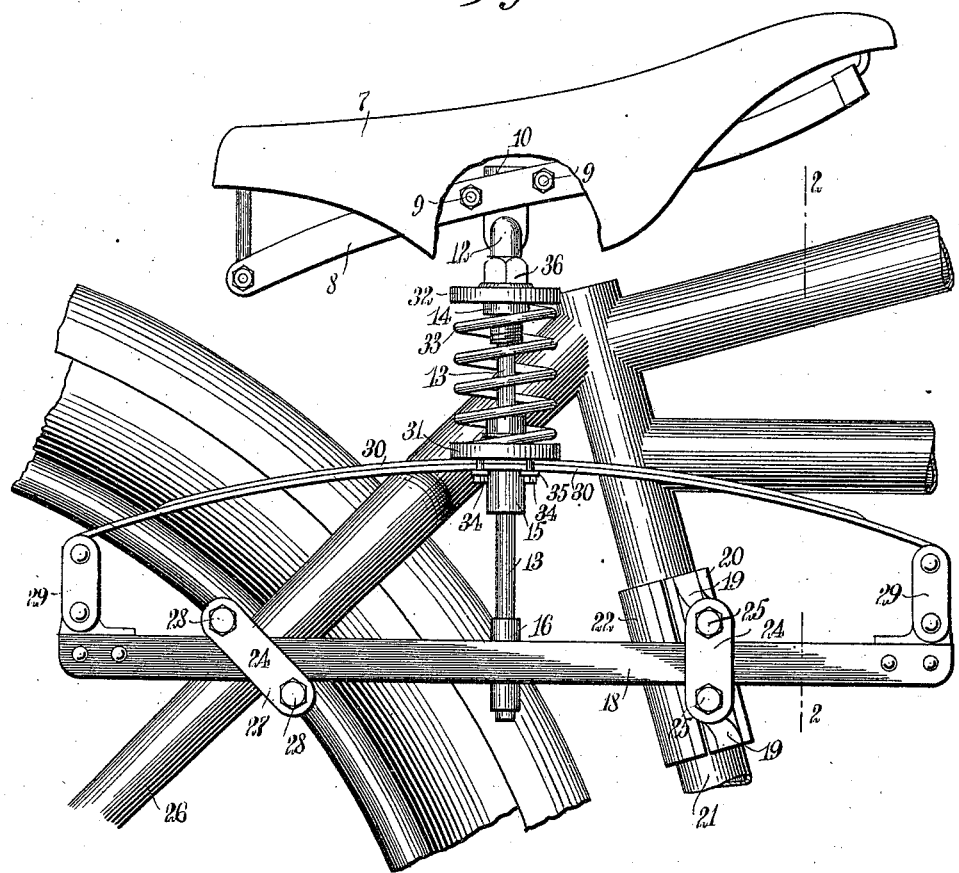
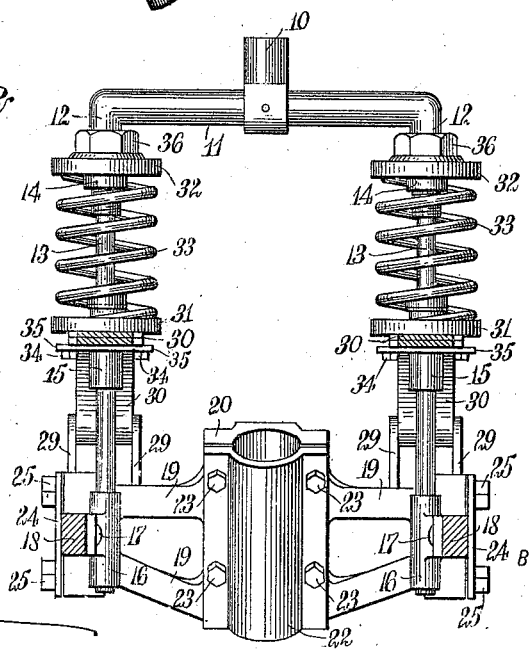
WITNESSES:
INVENTOR
Samuel Busch
BY
ATTORNEYS

UNITED STATES PATENT OFFICE.

SAMUEL BUSCH, OF NEW YORK, N. Y.

MOUNTING FOR MOTOR-CYCLE SADDLES.

975,827.  Specification of Letters Patent.  Patented Nov. 15, 1910.

Application filed July 26, 1910. Serial No. 573,940.

*To all whom it may concern:*

Be it known that I, SAMUEL BUSCH, a citizen of the United States, and a resident of the city of New York, borough of Manhattan, in the county and State of New York, have invented a new and Improved Mounting for Motor-Cycle Saddles, of which the following is a full, clear, and exact description.

Among the principal objects which the present invention has in view are: to provide means for adjusting a saddle to the various positions desired for riding; to provide a construction and arrangement of springs which form a sensitive and graduated cushion; and to provide a construction which is strong, simple and durable.

One embodiment of the present invention is disclosed in the structure illustrated in the accompanying drawings, in which like characters of reference denote corresponding parts in both the views, and in which—

Figure 1 is a side elevation of a saddle and mounting therefor constructed and arranged in accordance with the present invention; and Fig. 2 is a cross section, taken on the line 2—2 in Fig. 1, showing the mounting for the saddle, the saddle and motorcycle frame being removed.

The saddle seat 7 is constructed of any approved material, stretched or molded upon a frame, and provided with a longitudinal brace 8. The brace 8 is provided with the usual socket bit, which is clamped by means of bolts 9, 9 to the saddle post 10. The saddle post 10 is fixedly mounted upon a cross bar 11. The cross bar 11 is provided with down-turned extensions 12, 12 to which are rigidly connected plunger rods 13, 13. The down-turned extensions 12 are provided with screw threads at their lower ends to receive in engaged relation the flange nuts 14, 14.

The rods 13 are formed to any desired length and are inserted through thimbles 15, 15 and sockets 16, 16 to act as guides in the vertical vibration of the saddle. The sockets 16 are rigidly connected at 17, 17 to side bars 18, 18. The side bars 18, 18 are held rigidly in cross arms 19, 19 extended from a clip block 20. The clip block 20 is hollow to fit the frame post 21 of the motorcycle frame, and is clamped thereon by a cap 22 shaped substantially as shown in Fig. 2 of the drawings, by means of bolts 23, 23. The side bars 18 are held rigidly between the ends of the arms 19, 19 and clamps 24, 24 by means of bolts 25, 25. The side bars 18, 18 are supported at the rear of the post 21 upon the fork 26 of the motorcycle frame. The said side bars are held to the fork 26 by means of clamps 27, a clip block of suitable form being provided to infold the said fork and to receive the bolts 28, 28 to draw the clamps 27 tightly upon the said bars 18. The side bars 18 in this manner provide guides for the vibration of the saddle mounting and for the rods 13, 13 thereof. It is upon the side bars 18, 18 also that the saddle and mounting are supported.

At the ends of the side bars 18 are mounted pivot links 29, 29. The pivot links 29 are pivotally connected to the lower of the multiple leaf springs 30, 30. The leaf springs 30, 30 are pierced to pass the thimbles 15, 15. The thimbles 15 are elongated below and above the springs 30, and are provided with an annular flange 31. The nuts 14, 14 are provided with annular flanges 32, 32. The flanges 31 and 32 are cupped to receive in holding relation spiral springs 33, 33. The springs 33, 33 surround the rods 13 and the nuts 14 and thimbles 15, as shown in the drawings. The springs 30, 30 and 33, 33 rest upon the side bars 18, 18, and support in raised position the saddle 7 and mounting therefor. The thimbles 15 and flanges 31 thereof are made fast to the springs 30, 30 by bolts 34, 34, which are passed through the ends of small plates 35, 35 disposed under the said springs. The plates 35, 35 are clamped tightly against the springs 30, 30 when the said bolts 34, 34 are set up.

In the operation it will be observed that by loosening the bolts 23, 23 and 25, 25 in the forward clip, and the bolts 28, 28 in the rearward clip, the horizontal angle of the side bars 18, 18 may be changed at will. When the desired angle is obtained, by tightening the bolts 28, 28 and 25, 25 the said bars 18, 18 are set. The angle of the plunger rods 13, 13 and the saddle post 10 is changed with the changing of the side bars 18. By means of the screw threads on the extensions 12, 12 and in the nuts 14, 14 the said nuts may be raised and lowered on the extensions 12, thereby raising or lowering relatively the saddle 7. This slight adjustment admits of more exact adjustment of the seat to the needs of the rider. When the nuts 14 are properly adjusted they are held in fixed position by lock nuts 36, which are also mounted upon the extensions 12, 12.

The operation of the springs 30, 30 and 33, 33 is obvious. The springs 30, 30 are what are known as easy-riding springs. The springs 33, 33 perform the office in the present combination of buffer springs, but operate only when the thimbles 15 strike upon the top of the sockets 16. When this occurs the plunger rods 13 are reciprocated in the thimbles 15. During the compression of straining of the springs 30, 30 the said rods 13 are guided only in the sockets 16, 16.

It will be understood that by shifting the clip blocks 20 and the blocks mounted upon the fork 26, the saddle may be elevated or depressed to any desired position on the frame of the motorcycle.

Having thus described my invention, what I claim as new and desire to secure by Letters Patent is:—

1. A mounting for motorcycle saddles, comprising a cross bar having a plurality of depending guide rod extensions; a plurality of buffer springs infolding said extensions to support said cross bar; a plurality of leaf springs arranged to support said buffer springs; a rigid supporting frame for said leaf springs; means for clamping said supporting frame on the motorcycle; means for guiding the said extensions of said cross bar in the vibration thereof; and swinging connections between the said supporting frame and said leaf springs.

2. A mounting for motorcycle saddles, comprising a cross bar having a plurality of depending guide rod extensions; a plurality of buffer springs infolding said extensions to support said cross bar; a plurality of leaf springs arranged to support said buffer springs; a rigid supporting frame for said leaf springs; a plurality of clamping clip blocks arranged to be adjustably mounted on the frame of the motorcycle to hold the said supporting frame fixedly thereon at different elevations; and means for guiding the said extensions of said cross bar in the vibration thereof.

3. A mounting for motorcycle saddles, comprising a cross bar having a plurality of depending guide rod extensions; a plurality of buffer springs infolding said extensions to support said cross bar; a plurality of leaf springs arranged to support said buffer springs; a rigid supporting frame for said leaf springs; a plurality of clamping clip blocks arranged to be adjustably mounted on the frame of the motorcycle to hold the said supporting frame fixedly thereon at different elevations; swinging connections between the said supporting frame and said leaf springs; and means for guiding the said extensions of said cross bar in the vibration thereof.

4. A mounting for motorcycle saddles, comprising a cross bar having a plurality of depending guide rod extensions; a plurality of buffer springs infolding said extensions to support said cross bar; a plurality of leaf springs arranged to support said buffer springs; a rigid supporting frame for said leaf springs; means for clamping said supporting frame on the motorcycle; a plurality of guide sockets fixedly mounted on said supporting frame to guide the movement of said extensions during the vibration of the saddle and mounting therefor; and a plurality of thimble guides rigidly mounted on said leaf springs and slidably infolding said extensions, said thimble guides being disposed in line with said sockets.

5. A mounting for motorcycle saddles, comprising a cross bar having a plurality of depending guide rod extensions; a plurality of buffer springs infolding said extensions to support said cross bar; a plurality of leaf springs arranged to support said buffer springs; a plurality of side bars arranged to support said leaf springs; swinging connections between said side bars and said leaf springs; a clip block adapted to be fixedly mounted upon the vertical brace of the motorcycle and having cross arms extended to aline with said side bars; clamping plates arranged to infold said side bars and to clamp the same rigidly to said cross arms; a plurality of clamping clips arranged in holding relation with the rear forks of the motorcycle frame to receive in holding relation the said side bars; and means for guiding the said extensions of said cross bar in the vibration thereof.

6. A mounting for motorcycle saddles, comprising a cross bar having a plurality of depending guide rod extensions; a plurality of buffer springs infolding said extensions to support said cross bar; a plurality of leaf springs arranged to support said buffer springs; a plurality of side bars arranged to support said leaf springs; swinging connections between said side bars and said leaf springs; a clip block adapted to be fixedly mounted upon the vertical brace of the motorcycle and having cross arms extended to aline with said side bars; clamping plates arranged to infold said side bars and to clamp the same rigidly to said cross arms; a plurality of clamping clips arranged in holding relation with the rear forks of the motorcycle frame to receive in holding relation the said side bars; means for guiding the said extensions of said cross bar in the vibration thereof; a plurality of guide sockets fixedly mounted on said side bars; and a plurality of thimble guides rigidly mounted on said leaf springs and slidably infolding said extensions, said thimble guides being disposed in line with said sockets.

In testimony whereof I have signed this specification in the presence of two subscribing witnesses.

SAMUEL BUSCH.

Witnesses:
E. F. MURDOCK,
PHILIP D. ROLLHAUS.